(12) United States Patent
Hawthorne et al.

(10) Patent No.: US 7,152,476 B2
(45) Date of Patent: Dec. 26, 2006

(54) MEASUREMENT OF MOTIONS OF ROTATING SHAFTS USING NON-VIBRATING CONTACT POTENTIAL DIFFERENCE SENSOR

(75) Inventors: Jeffrey Alan Hawthorne, Decatur, GA (US); M. Brandon Steele, Decatur, GA (US)

(73) Assignee: QCEPT Technologies, Inc., Atlanta, GA (US)

( * ) Notice: Subject to any disclaimer, the term of this patent is extended or adjusted under 35 U.S.C. 154(b) by 158 days.

(21) Appl. No.: 10/897,758

(22) Filed: Jul. 23, 2004

(65) Prior Publication Data

US 2005/0016279 A1    Jan. 27, 2005

Related U.S. Application Data

(60) Provisional application No. 60/490,161, filed on Jul. 25, 2003.

(51) Int. Cl.
*G01H 11/02* (2006.01)

(52) U.S. Cl. .................................................. 73/660
(58) Field of Classification Search ................. 73/650, 73/660
See application file for complete search history.

(56) References Cited

U.S. PATENT DOCUMENTS

| | | | |
|---|---|---|---|
| 2,460,115 A * | 1/1949 | Adamson | 310/161 |
| 4,166,974 A | 9/1979 | Vermeers | |
| 4,295,092 A | 10/1981 | Okamura | |
| 4,481,616 A | 11/1984 | Matey | |
| 4,973,910 A | 11/1990 | Wilson | |
| 5,033,305 A * | 7/1991 | Rozelle et al. | 73/650 |
| 5,038,616 A * | 8/1991 | Schneider et al. | 73/660 |
| 5,087,533 A | 2/1992 | Brown | |
| 5,136,247 A | 8/1992 | Hansen | |
| 5,214,389 A | 5/1993 | Cao et al. | |
| 5,217,907 A | 6/1993 | Bulucea et al. | |
| 5,218,362 A | 6/1993 | Mayes et al. | |
| 5,270,664 A | 12/1993 | McMurtry et al. | |
| 5,272,443 A | 12/1993 | Winchip et al. | |
| 5,278,407 A | 1/1994 | Ikebe et al. | |
| 5,293,131 A | 3/1994 | Semones et al. | |
| 5,315,259 A | 5/1994 | Jostlein | |
| 5,369,370 A | 11/1994 | Stratmann et al. | |
| 5,381,101 A | 1/1995 | Bloom et al. | |
| 5,460,684 A | 10/1995 | Saeki et al. | |
| 5,517,123 A | 5/1996 | Zhao et al. | |
| 5,583,443 A | 12/1996 | McMurtry et al. | |
| 5,723,980 A | 3/1998 | Haase et al. | |
| 5,723,981 A | 3/1998 | Hellemans et al. | |

(Continued)

FOREIGN PATENT DOCUMENTS

DE           297509 A5      1/1992

(Continued)

OTHER PUBLICATIONS

Moorman, M. et al., "A Novel, Micro-Contact Potential Difference Probe," Sensors and Actuators B, Elsevier Sequoia S.A., Lausanne, CH, vol. 94, No. 1.

(Continued)

*Primary Examiner*—Hezron Williams
*Assistant Examiner*—Rose M. Miller
(74) *Attorney, Agent, or Firm*—Foley & Lardner LLP

(57) ABSTRACT

An apparatus having a non-vibrating contact potential probe. The non-vibrating contact potential probe is capable of measuring the chemical and geometrical irregularities on a rotating shaft. The chemical and geometrical information can be used to determine various properties of the rotating shaft.

19 Claims, 2 Drawing Sheets

U.S. PATENT DOCUMENTS

| | | | |
|---|---|---|---|
| 5,734,108 A * | 3/1998 | Walker et al. | 73/650 |
| 5,773,989 A | 6/1998 | Edelman et al. | |
| 5,974,869 A | 11/1999 | Danyluk et al. | |
| 5,977,788 A | 11/1999 | Lagowski | |
| 6,011,404 A | 1/2000 | Ma et al. | |
| 6,037,797 A | 3/2000 | Lagowski et al. | |
| 6,091,248 A | 7/2000 | Hellemans et al. | |
| 6,092,029 A * | 7/2000 | Bently | 702/56 |
| 6,094,971 A | 8/2000 | Edwards et al. | |
| 6,097,196 A | 8/2000 | Verukuil et al. | |
| 6,114,865 A | 9/2000 | Lagowski et al. | |
| 6,127,289 A | 10/2000 | Debusk | |
| 6,139,759 A | 10/2000 | Doezema et al. | |
| 6,198,300 B1 | 3/2001 | Doezema et al. | |
| 6,201,401 B1 | 3/2001 | Hellemans et al. | |
| 6,232,134 B1 | 5/2001 | Farber et al. | |
| 6,255,128 B1 | 7/2001 | Chacon et al. | |
| 6,265,890 B1 | 7/2001 | Chacon et al. | |
| 6,517,669 B1 | 2/2003 | Chapman | |
| 6,520,839 B1 | 2/2003 | Gonzalez-Martin et al. | |
| 6,538,462 B1 | 3/2003 | Lagowski et al. | |
| 6,546,814 B1 | 4/2003 | Cloe et al. | |
| 6,551,972 B1 | 4/2003 | Lei et al. | |
| 6,597,193 B1 | 7/2003 | Lagowski et al. | |
| 6,664,546 B1 | 12/2003 | McCord et al. | |
| 6,664,800 B1 | 12/2003 | Chacon et al. | |
| 6,679,117 B1 | 1/2004 | Danyluk et al. | |
| 6,680,621 B1 | 1/2004 | Savtchouk et al. | |
| 6,711,952 B1 | 3/2004 | Leamy et al. | |
| 6,717,413 B1 | 4/2004 | Danyluk et al. | |
| 2002/0140564 A1 | 10/2002 | Danyluk et al. | |
| 2002/0186036 A1 | 12/2002 | Smith | |
| 2003/0052374 A1 | 3/2003 | Lee et al. | |
| 2003/0129776 A1 | 7/2003 | Eom et al. | |
| 2003/0139838 A1 | 7/2003 | Marella | |
| 2003/0164942 A1 | 9/2003 | Take | |
| 2003/0175945 A1 | 9/2003 | Thompson et al. | |
| 2004/0029131 A1 | 2/2004 | Thompson et al. | |
| 2004/0057497 A1 | 3/2004 | Lagowski et al. | |
| 2004/0058620 A1 | 3/2004 | Gotkis et al. | |
| 2004/0105093 A1 | 6/2004 | Hamamatsu et al. | |
| 2004/0134515 A1 | 7/2004 | Castrucci | |

FOREIGN PATENT DOCUMENTS

| | | |
|---|---|---|
| EP | 1039277 | 3/2000 |
| EP | 1304463 | 4/2003 |
| WO | WO 01/90730 A2 | 11/2001 |
| WO | WO 2004/070355 A2 | 8/2004 |

OTHER PUBLICATIONS

Reid, Jr., Lennox Errol, "Surface Characterization of Hard Disks Using Non-Contact Work Function Capacitance Probe," A Thesis Presented to the Academic Faculty in Partial Fulfillment of the Requirements for the Degree of Master of Science in Mechanical Engineering, Georgia Institute of Technology, Jun. 1986, pp. 1-132.

B Scruton and B.H. Blott, A High Resolution Probe for Scanning Electrostatic Potential Profiles Across Surfaces; Journal of Physics E: Scientific Instruments (May 1973), pp. 472-474; vol. 6, No. 5, Printed in Great Britain.

Yano D et al: "Nonvibrating contact potential difference probe measurement of a nanometer-scale lubricant on a hard disk", Journal of Tribology, American Society of Mechanical Engineers, New York, NY, US; vol. 121, No. 4, Oct. 1999, pp. 980-983, XP008031092, ISSN: 0742-4787 (pp. 980-981, fig. 4, first ref. on p. 983).

Castaldini A et al: "Surface analyses of polycrystalline and Cz-Si wafers", Solar Energy Materials and Solar Cells, Elsevier Science Publishers, Amsterdam, NL; vol. 72, No. 1-4, Apr. 2002, pp. 425-432, XP004339790, ISSN: 0927-0248 (whole document).

Korach C S et al: "Measurement of perfluoropolyether lubricant thickness on a magnetic disk surface", Applied Physics Letters, American Institute of Physics, New York, NY, US; vol. 79, No. 5, Jul. 30, 2001, pp. 698-700, XP012029958, ISSN: 0003-6951 (p. 699, left column; fig. 2).

Yang Y et al: "Kelvin probe study on the perfluoropolyether film on metals", Tribology Letters, 2001, Kluwer Academic/Plenum Publishers, USA, vol. 10, No. 4, pp. 211-216, XP009035197, ISSN: 1023-8883 (pp. 211-212).

Castaldini A et al: "Scanning Kelvin probe and surface photovoltage analysis of multicrystalline silicon", Materials Science and Engineering B., Elsevier Sequoia, Lausanne, CH; vol. 91-92, Apr. 30, 2002, pp. 234-238, XP004355534, ISSN: 0921-5107 (chapters "2.2 Scanning Kelvin probe: and "4.2 Scanning Kelvin probe analyses).

Lagel B et al: "A novel detection system for defects and chemical contamination in semiconductors based upon the scanning Kelvin probe", 14th International Vacuum Congress (IVC-14). 10th International Conference on Solid Surfaces (ICS-10). 5th International Conference on Nanometre-Scale Science and Technology (NANO-5). 10th International Conference on Quantitative Surface Analysis; vol. 433-435, pp. 622-626, XP002292441, Surface Science, Aug. 2, 1999, Elsevier, NL, ISSN: 003906028 (whole document).

Ren J et al: "Scanning Kelvin Microscope: a new method for surface investigations" 8. Arbeitstatgung Angewandte Oberflachenanalytik 'AOFA 8' ('Applied Surface Analysis'), Kaiserslautern, DE, Sep. 5-8, 1994; vol. 353, No. 3-4, pp. 303-306, XP009035181, Fresenius' Journal of Analytical Chemistry, October 1995, Springer-Verlag, DE, ISSN: 0937-0633 (p. 304, right column; fig. 1).

Baumgartner H et al: "Mirco Kelvin probe for local work-function measurements", Review of Scientific Instruments, May 1988, USA; vol. 59, No. 5, pp. 802-805, XP0022922442, ISSN: 0034-6748 (abstract; fig. 4, chapter "V. Results").

Danyluk S: "Non-vibrating contact potential imaging for semiconductor fabrication", Semicon West 2003, 'Online!, Jul. 14, 2003, pp. 1-15, XP002292443, retrieved from the internet:, URL:http://dom.semi.org/web/wFiles.nsf/Lookup/TIS18_QceptTechnologiesInc/$file/TIS18%20QceptTechnologiesInc.Alternate.pdf. retrieved on Aug. 13, 2004 (whole document).

* cited by examiner

MEASUREMENT OF MOTIONS OF ROTATING SHAFTS USING NON-VIBRATING CONTACT POTENTIAL DIFFERENCE SENSOR

CROSS-REFERENCE TO RELATED PATENT APPLICATIONS

This application is an application claiming the benefit under 35 U.S.C. 119(e) of U.S. Provisional Application No. 60/490,161, filed Jul. 25, 2003, incorporated herein by reference in its entirety.

BACKGROUND OF THE INVENTION

Many mechanical systems include rotating shafts for coupling or transmitting rotational energy from one location to another. Examples include but are not limited to the shafts used in cars, boats, planes, power generation turbines and compressors. In many cases it is necessary or desirable to measure the motion of the shaft in operation. Specific measurements of interest include but are not limited to rotational velocity, rotational acceleration, rotational vibration (also called torsional vibration), lateral vibration, twist and torque. These measurements may be necessary to control the motion of the shaft during operation, to monitor the shaft or machine for motions that indicate problems or potential failures, or to evaluate and optimize the performance of the machine during design or manufacture.

Contact potential difference (CPD) measurements have been used as one form of sensor technology. CPD refers to the fact that different metals have different electon energies and work functions, and that when two metals are placed in electrical contact, electrons flow from the metal with the lower work function to the metal with the higher work function. If two different metals are connected electrically and then brought in close proximity, then an electric filed is formed between them as a result of their CPD.

"Vibrating CPD sensor" refers to the vibration of one metal relative to the other in a parallel plate capacitor system. That is, the vibrating CPD sensor operates by electrically connecting two metals and vibrating one metal of known work function (the probe) over the second metal of unknown work function. The vibration induces changes in capacitance over time. A time varying signal is generated that is a function of the capacitance and the voltage that results from the CPD between the two metals. A variable electrical potential is applied between the two metals and adjusted until the time-varying current is eliminated. The resulting applied voltage is the CPD between the two metals. The work function of the unknown metal can then be calculated as the work function of the probe plus or minus the applied potential. Non-vibrating CPD sensors (nvCPD) are also known. Such probes are not vibrated, but rather the probe and the testing surface are moved relative to each other. This translation makes high speed scanning possible.

Several options exist to monitor the motion of a rotating shaft. The most common method of measuring rotary shaft motion is to use an encoder. An encoder is a device that attaches to a shaft and converts rotary motion into electrical pulses. Encoders can provide precise information on shaft motion, but they are relatively expensive and require substantial effort to mount on a shaft. Lower-cost or temporary encoders for measuring rotary motion can be built by mounting some sort of target to the shaft and then detecting the presence or location of the target using a separate sensor. For example, magnetic targets can be mounted to a shaft and detected using Hall Effect sensors, or a patterned tape can be mounted on the shaft and motion detected using an optical sensor. These techniques require the effort and expense of modifying the shaft so that its motion can be detected, and are limited to detecting rotary motion. It is also possible to measure shaft motion without modifying the shaft by mounting optical or eddy current sensors above a gear to detect the presence or motion of gear teeth. This technique is limited in that it can only be used at the locations of gears in the system.

Several techniques also exist for measuring lateral vibrations of a rotating shaft. These include the use of laser interferometers or eddy current sensors to detect the distance between the sensor and the surface of the shaft. Vibrations can also be detected using accelerometers mounted to various locations on the machine. These techniques are limited to measuring lateral vibration and, in the case of accelerometers, measuring machine vibrations and not the vibration of the shaft itself. In general, it can be expensive, time-consuming, and difficult to precisely measure both the lateral and rotary motions of a rotating shaft.

SUMMARY OF THE INVENTION

The present invention generally relates to measurement methods and systems. More specifically, the present invention relates to measurement methods and systems using non-vibrating contact potential difference sensors.

The present invention relates to a system and method of measuring the motion of a rotating shaft using one or more non-vibrating contact potential difference (nvCPD) sensor(s), described herein before. The nvCPD sensor(s) are mounted in proximity to a rotating shaft. The output of the sensor is generated by small physical or chemical changes on the surface of the shaft. These changes occur naturally in all shafts, but they can also be induced onto the shaft surface by creating physical or chemical marks. Such marker features generate a pattern that can be detected by the nvCPD sensor. This pattern repeats with each rotation of the shaft. The output of the sensor(s) can be processed in either the time or frequency domains to extract the rotational velocity, the rotational acceleration, and/or rotational (torsional) vibration of the shaft. Comparison of the phases of signals from two or more sensors can be used to measure the twist and torque applied to the shaft. In addition, a bias voltage can be applied to the nvCPD sensor so that the output results predominantly from changes in the distance between the sensor and the surface of the shaft. The output of the biased sensor can be processed in either the time or frequency domains to detect and measure lateral vibrations or motions of the shaft.

DETAILED DESCRIPTION OF THE PREFERRED EMBODIMENTS

Figure 1:
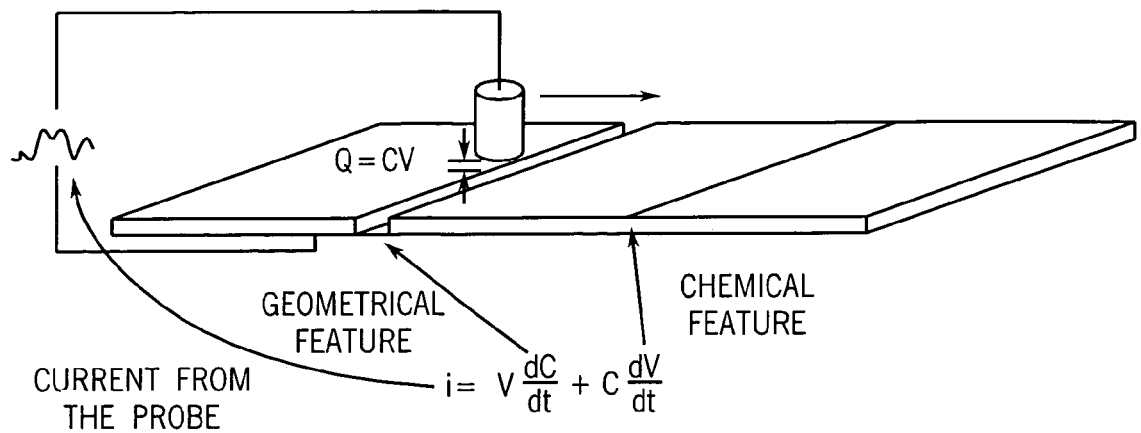
FIG. 1 illustrates the theory of operation for a Non-Vibrating Contact Potential Difference (nvCPD) sensor.

The present invention provides methods and systems for using nvCPD sensors to detect features, for example, including but not limited to physical or chemical features, on a surface that is in motion relative to the sensor itself. FIG. 1 illustrates the theory of operation for a nvCPD sensor. In a preferred embodiment, the output of an nvCPD sensor is an electrical current that is a function of both chemical changes on a surface and changes in the capacitance between the sensor and surface. The nvCPD sensor can therefore be used to detect both chemical and physical changes on a surface. In one embodiment, an nvCPD sensor can be built to have a variable and automatically adjustable bias voltage that can be used to automatically alter the sensor so that it detects predominantly capacitance changes between the sensor and surface. These capacitance changes can be used to measure the distance between the sensor and a moving surface. The apparatus is capable of monitoring the performance of the rotating shaft and to detect abnormal motions which can indicated an impending breakdown. The shaft data collected by the nvCPD sensor can be compared to historical or theoretical data on shaft performance and thus used to determine if the system is likely to experience a breakdown at some point in the future. In an exemplary embodiment, this is done by looking at torsional or lateral vibrations in the frequency domain and examining how the vibrations change over time.

The nvCPD apparatus of the present invention utilizes a probe as a first metal surface and a testing surface as a second metal. These two metals are then placed in close proximity and moved relative to each other so that a somewhat consistent gap is maintained between them. Changes in capacitance or voltage between the two metals result in currents into or out of the probe. These currents indicate changes in either the capacitance between the probe and surface or changes in the voltage between the probe and surface. Changes in the voltage result from chemical changes on the measured surface that result in changes in the surface work function and resulting CPD.

The charge Q on a capacitor is given by the equation: Q=CV; where C is the capacitance and V is the voltage.

Differentiating both sides yields:

$$\frac{dQ}{dt} = i = \frac{d(CV)}{dt} = C\frac{dV}{dt} + V\frac{dC}{dt}$$

where i is the current into our out of the probe tip.

if
$\Phi p$=work function of the probe, and
$\Phi s$=work function of the surface to be measured, then
CPD=$(\Phi p - \Phi s)/e$, where e is the charge of an electron.

In a vibrating CPD sensor CPD (V) is fixed, so the current out is:

$$i = V\frac{dC}{dt};$$

where the change in capacitance is provided by the vibrating motion.

With a non-vibrating CPD sensor, both voltage (V) and capacitance (C) change as the probe moves relative to the surface. The current out of the probe tip is given by:

$$i = C\frac{dV}{dt} + V\frac{dC}{dt}$$

The first term, $$C\frac{dV}{dt},$$

is the current due to changes in the voltage between the probe and surface. This voltage is due to the CPD. Since the work function of the probe is fixed, changes in voltage are the result of changes in the work function of the surface being measured. The second term, $$V\frac{dC}{dt},$$

is the current due to changes in the capacitance between the probe tip and the surface being measured. Changes in capacitance are usually due to changes in the distance between the probe tip and surface. If the sensor is firmly attached to a fixed reference surface, then the signal from this term is the result of changes in sensor-surface gap due to motion of the surface. This unique sensor output that contains information about both the chemistry and motion of the measured surface has important advantages in monitoring the motion of a rotating shaft.

Figure 2:
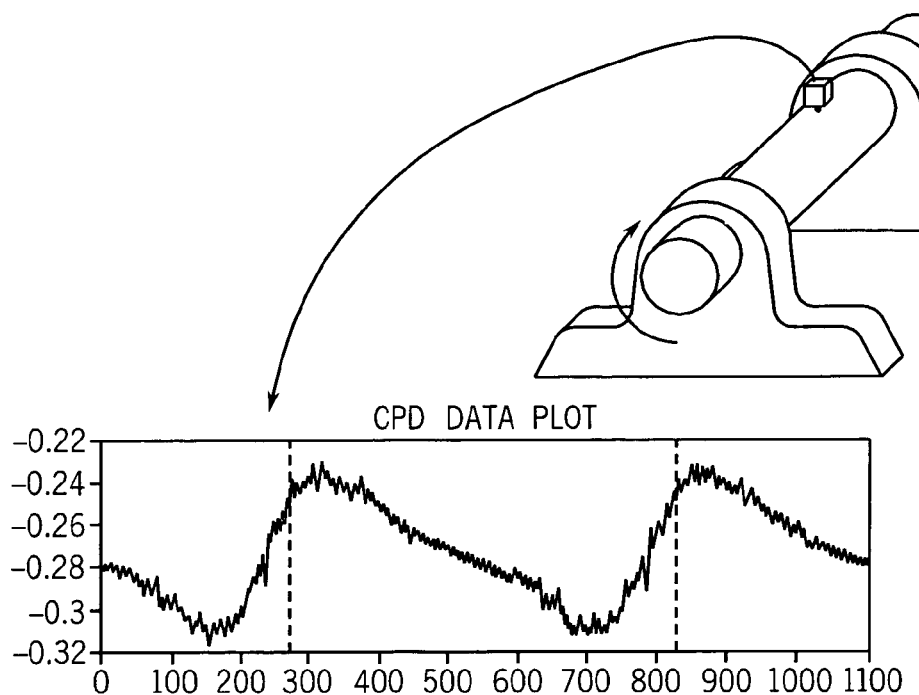
FIG. 2 is a drawing of a nvCPD sensor mounted above a rotating shaft with a sample output showing periodic signal from the shaft surface.

In an exemplary embodiment, one or more nvCPD sensors are placed in close proximity to a moving shaft and the output of each nvCPD sensor is converted into a series of digital values. FIG. 2 illustrates a sample output showing a periodic signal from the shaft surface. As can be seen in FIG. 2, the signal exhibits a periodic or repeating pattern, which in essence represents one revolution of the shaft or component being rotated. These values are processed in either the time or frequency domains to determine the frequency at which the signal repeats. This frequency determines the rotational velocity of the shaft. Changes in the frequency determine the rotational acceleration of the shaft. Multiple position, velocity or acceleration measurements can be used to detect and measure rotational vibrations of the shaft.

A CPD sensor can also be built so that a bias voltage can be applied to each sensor to increase the magnitude of the output signal that is due to capacitance changes. This component can be made much larger than the output component that is due to chemical changes on the shaft surface. As a result, the output current can be made largely a function of the distance between the sensor and the shaft surface. This output can be processed in the time or frequency domains to detect the frequency and magnitude of any lateral vibrations or motions of the shaft. This information can be combined with information about the rotational velocity to determine if the lateral vibrations are at the same frequency as the rotation of the shaft or at some multiple of the shaft frequency. This information can be useful for determining the source of the vibration.

In addition, a biased sensor can be used to extract a signal which consists solely of height data. If two scans are acquired of the same surface with different bias voltages, then one scan can be subtracted from the other to eliminate chemistry information from the signal.

Looking at the equation for the current out of the probe tip:

$$i = C\frac{dV}{dt} + V\frac{dC}{dt}$$

if two scans of the same surface are made with two different bias voltages, b1 and b2, then the resulting currents are:

$$i_{b1} = C\frac{dV}{dt} + (V_{CPD} + V_{b1})\frac{dC}{dt}$$

-continued $$i_{b2} = C\frac{dV}{dt} + (V_{CPD} + V_{b2})\frac{dC}{dt}$$

Subtracting the second scan from the first results in a signal that is solely dependant on capacitance (height) changes:

$$i_{b1} - i_{b2} = (V_{b1} - V_{b2})\frac{dC}{dt}$$

This technique can be used to extract height information from the combined height and data information present in the nvCPD sensor signal. This height information can be used to measure lateral (radial) motion of a shaft such as vibration or wobble.

In order to make quantitative measurements of shaft motion or vibration, it is necessary to know the approximate mean or starting distance between the probe tip and the surface of the shaft. This may be accomplished in several ways, some of which are described below, however these embodiments are not to be considered limiting, but merely exemplary.

In one exemplary embodiment, when the sensor is installed, a piece of material of know thickness can be inserted between the probe tip and shaft surface to adjust the probe to a known height. The piece of material is sometimes called a feeler gauge or spacer.

In another exemplary embodiment, the sensor is moved towards the shaft surface until the probe tip makes contact. This results in a large signal output from the sensor that can be automatically detected by signal processing. The sensor can then be moved a known distance away from the shaft surface.

In another exemplary embodiment, a time-varying bias signal can be applied to the sensor or shaft. The output of the sensor will vary with the capacitance between the probe tip and the shaft surface. The output can be compared to a calibrated curve to determine the approximate distance between the probe tip and shaft.

In some instances the shaft may not be well-grounded or electrically connected to other mechanical components. Thus, in one exemplary embodiment, an electrical connection is added between the shaft and a ground point.

Figure 3:
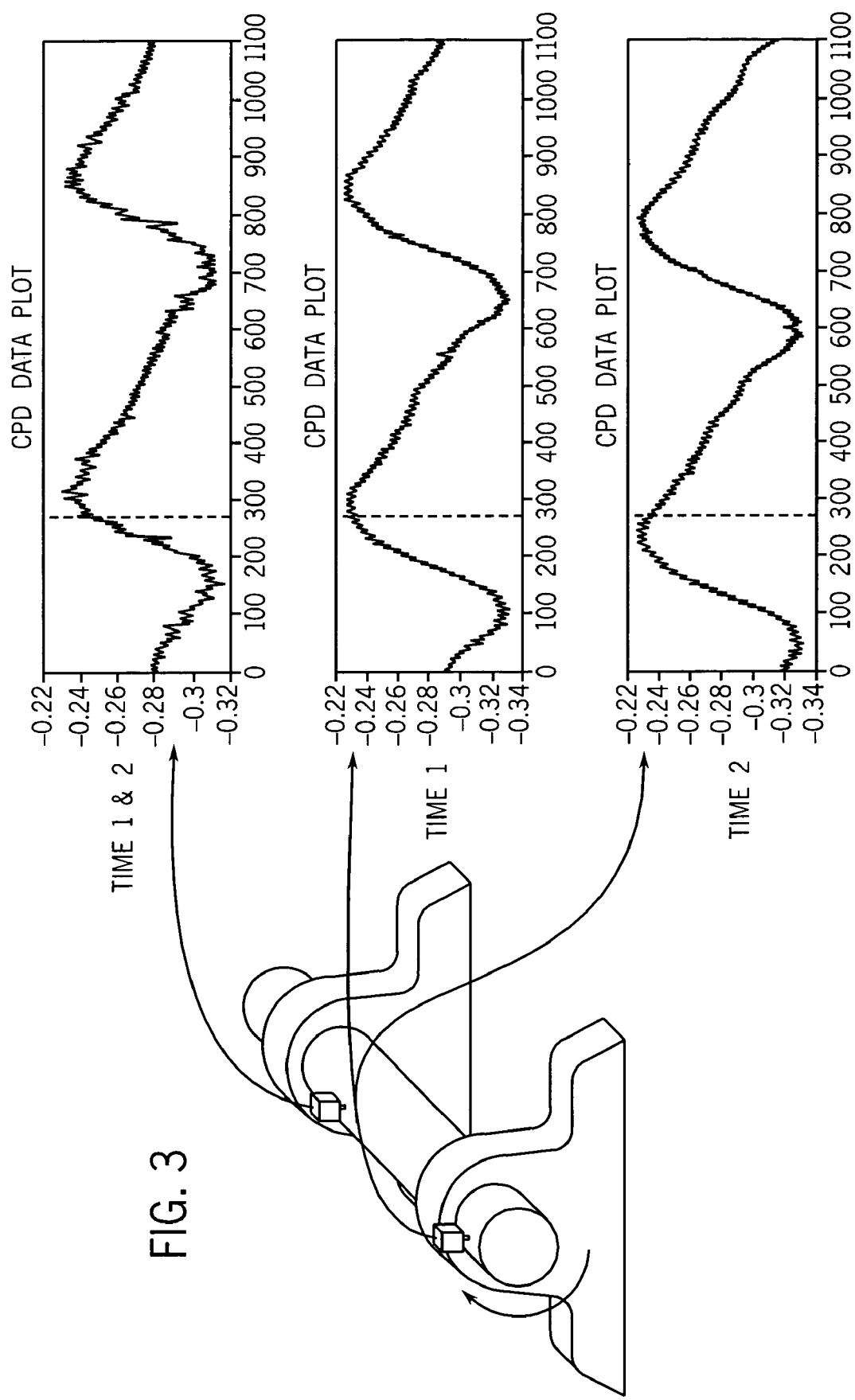
FIG. 3 is a comparison of the phase changes between two sensors at opposite ends of a shaft which can be used to measure twist in the shaft, and calculate the applied torque.

In another embodiment, information from multiple sensors can be combined to determine twist of the shaft. As illustrated in FIG. 3, the signals for two probes located at different locations will exhibit a phase shift dependent on the twist of the shaft being rotated. Material properties of the shaft can be used to calculate the torque on the shaft between the two points.

It should be understood that various changes and modifications preferred in to the embodiment described herein would be apparent to those skilled in the art. Such changes and modifications can be made without departing from the spirit and scope of the present invention and without demising its attendant advantages.

What is claimed is:

1. An system for monitoring motion of a rotating shaft as part of a machine comprising:
   at least one non-vibrating contact potential probe;
   a source of historical data regarding performance of the shaft;
   the historical data indicating whether the shaft is in a state selected from the group consisting of a normal state and an abnormal state;
   a mechanism for measuring a contact potential difference between the rotational shaft and the at least non-vibrating contact potential probe; and
   an output signal from the probe characteristic of the measured contact potential difference, said output signal compared to the historical data enabling at least one of controlling motion of the rotary shaft, monitoring for motion indicative of problems or potential failure and evaluating and optimizing performance of the machine.

2. The apparatus of claim 1 further comprising a system component for altering the signal output by the at least one non-vibrating contact potential probe.

3. The apparatus of claim 2, wherein the system component for altering the signal comprises a bias voltage source which applies a voltage to the at least one non-vibrating contact potential probe.

4. The apparatus of claim 1, wherein the at least one non-vibrating contact potential probe comprises a plurality of probes.

5. The apparatus of claim 4, wherein the plurality of probes comprise a first probe and a second probe located a fixed distance apart.

6. The apparatus of claim 1, wherein the abnormal state indicated by the data is torsional or lateral vibration.

7. The apparatus of claim 1 further comprising an electrical connection between the shaft and either the non-vibrating contact potential sensor or a ground point.

8. A method of measuring rotation of a rotating shaft component and its operating state, comprising the steps of:
   providing a non-vibrating contact potential probe;
   rotating the rotating shaft component with respect to the non-vibrating contact potential probe;
   monitoring the relative motion between the non-vibrating capacitance probe and the rotating shaft component;
   measuring the change in voltage and the change in current due to the relative motion; and
   outputting a signal comprising voltage information and current information characteristic of an operating state of the rotating shaft component undergoing rotation.

9. The method of claim 8 further comprising the step of converting the signal to digital values.

10. The method of claim 8 further comprising the step of processing the signal in a domain to determine a frequency at which the signal repeats.

11. The method of claim 8 further comprising the step of altering the signal to make a capacitance portion of the signal much larger than a voltage portion of the signal which is characteristic of the chemical charge of a measured surface of the rotating shaft component.

12. The method of claim 11, wherein the step of altering the signal comprises applying a bias voltage to the non-vibrating contact potential probe wherein the magnitude of the capacitance portion of the signal is increased.

13. The method of claim 12 further comprising the step of comparing the altered signal with an unaltered signal to determine at least one of magnitude and frequency of lateral vibrations in the rotating shaft component.

14. The method of claim 8, wherein the step of providing a non-vibrating contact potential probe includes providing a first non-vibrating contact potential probe and a second non-vibrating contact potential probe.

15. The method of claim 14 further comprising the step of spacing the first non-vibrating contact potential probe a fixed distance from the second non-vibrating contact potential probe, wherein the change in the phase of repetition of the signal at the two locations indicates a twist.

16. The method of claim 8 further comprising the step of forming an irregularity on the surface of the rotating shaft component.

17. A process for using surface variations on a shaft to determine at least one characteristic of the shaft, the process comprising the steps of:
   providing a non-vibrating contact potential probe;
   rotating the shaft with respect to the non-vibrating contact potential probe;
   outputting a signal caused by motion of the shaft relative to the non-vibrating contact potential probe;
   interpreting the signal to determine at least one characteristic of the shaft; and
   further comprising the step of altering the signal to make a capacitance portion of the signal much larger than a voltage portion of the signal which is characteristic of the chemical charge of a measured surface of the rotating shaft.

18. The process of claim 17, wherein the step of altering the signal comprises applying a bias voltage to the non-vibrating contact potential probe wherein the magnitude of the capacitance portion of the signal is increased.

19. The process of claim 17 comprising a first non-vibrating contact potential sensor and a second non-contact potential sensor and further comprising the step of spacing the first non-vibrating contact potential probe a fixed distance from the second non-vibrating contact potential probe, wherein the change in the phase of repetition of the signal at the two locations indicates a twist.

* * * * *